Figure 1A:
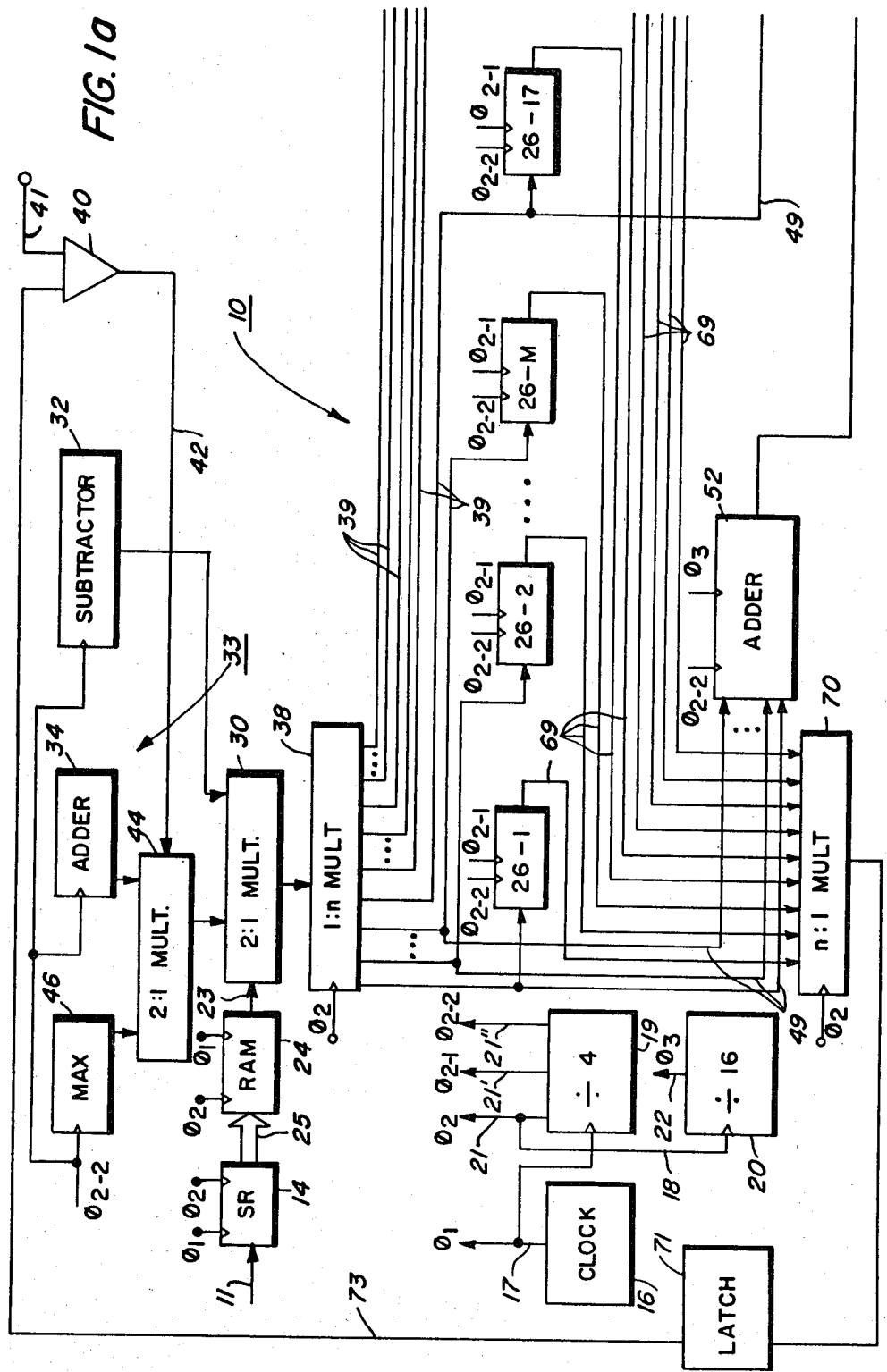

United States Patent [19]

Tomory et al.

[11] 4,400,738
[45] Aug. 23, 1983

[54] IMAGE SIGNAL PROCESSING METHOD AND APPARATUS

[75] Inventors: Ronald S. Tomory; James M. Odorczyk, both of Webster, N.Y.

[73] Assignee: Xerox Corporation, Stamford, Conn.

[21] Appl. No.: 316,626

[22] Filed: Oct. 30, 1981

[51] Int. Cl.³ ............................................. H04N 1/40
[52] U.S. Cl. .................................. 358/283; 358/298; 358/284
[58] Field of Search ............... 358/283, 298, 280, 282, 358/284

[56] References Cited

U.S. PATENT DOCUMENTS

| | | | |
|---|---|---|---|
| 3,952,144 | 4/1976 | Kolker | 178/6 |
| 4,194,221 | 3/1980 | Stoffel | 358/283 |
| 4,196,453 | 4/1980 | Warren | 358/283 |
| 4,205,341 | 5/1980 | Mitsuya et al. | 358/135 |
| 4,342,051 | 7/1982 | Suzuki et al. | 358/283 |

Primary Examiner—Robert L. Griffin
Assistant Examiner—Edward L. Coles
Attorney, Agent, or Firm—Frederick E. McMullen

[57] ABSTRACT

A two stage image processing apparatus and method wherein, in a first stage, successive groups of image pixels are used to address a RAM based look up table to provide a preliminary breakdown between halftone and textural images. As a second stage, to further enhance the differentiation between halftone and textural images, the output of the RAM address table is employed to generate a count signal. Previous counts stored in a succession of counters are used to determine a new count, a predetermined number of which are summed as a block by an adder in response to the count signal. The is compared with a preset threshold to generate a control signal for operating a pixel generator. The new counts are used to update the counters, the count on the counter serving to represent prior pixel processing conditions.

11 Claims, 3 Drawing Figures

IMAGE SIGNAL PROCESSING METHOD AND APPARATUS

The invention relates to electronic image processing, and more particularly to electronic image processing using both micro and macro halftone detection.

To obtain optimum copy quality in copying systems using electronic or video image signals, image halftone areas must be processed in a different manner than line or text image areas. In order to do so, the halftone image areas must be detected in timely fashion. And while halftone image detection may be practiced, it is also desirable to include a low level of detection of line or text image areas. This latter is needed because an error in a line copy region will result in ragged edges and holes in the copy with resultant degradation in copy quality.

The invention relates to a method of processing image pixels to enhance distinctions between halftone and text image areas, the steps which comprise: performing an initial distinction between halftone and text image areas by addressing a memory having predetermined halftone and text relationships stored therein with successive groups of the image pixels to provide halftone and text signals; generating a count signal in accordance with the halftone and text signals for each group of image pixels; providing a preset count in response to the count signal for each group of image pixels; summing a predetermined number of the preset counts to provide a total count; comparing the total count with a predetermined fixed threshold to provide an enhanced control signal identifying the presence of either halftone or text images; and operating an image signal generator to output halftone or text image signals in response to the enhanced control signal.

The invention further relates to apparatus for processing image pixels to enhance distinction between halftone and text image areas comprising in combination; memory means for storing discrete halftone and text image signals at predetermined addresses; addressing means for addressing the memory means using a preset combination of successive image pixels to provide halftone and text identifying signals; a plurality of scanline counters; a plurality of adders, there being one adder associated with each of a preset number of counters; means for successively processing the count on each of the counters to provide a predetermined count; means for loading the adder associated with the counters with predetermined counts; means for deriving a halftone or text signal from the output of the adders; and means for generating halftone or text pixels in response to the halftone and text image signals.

IN THE DRAWINGS

Figure 1B:
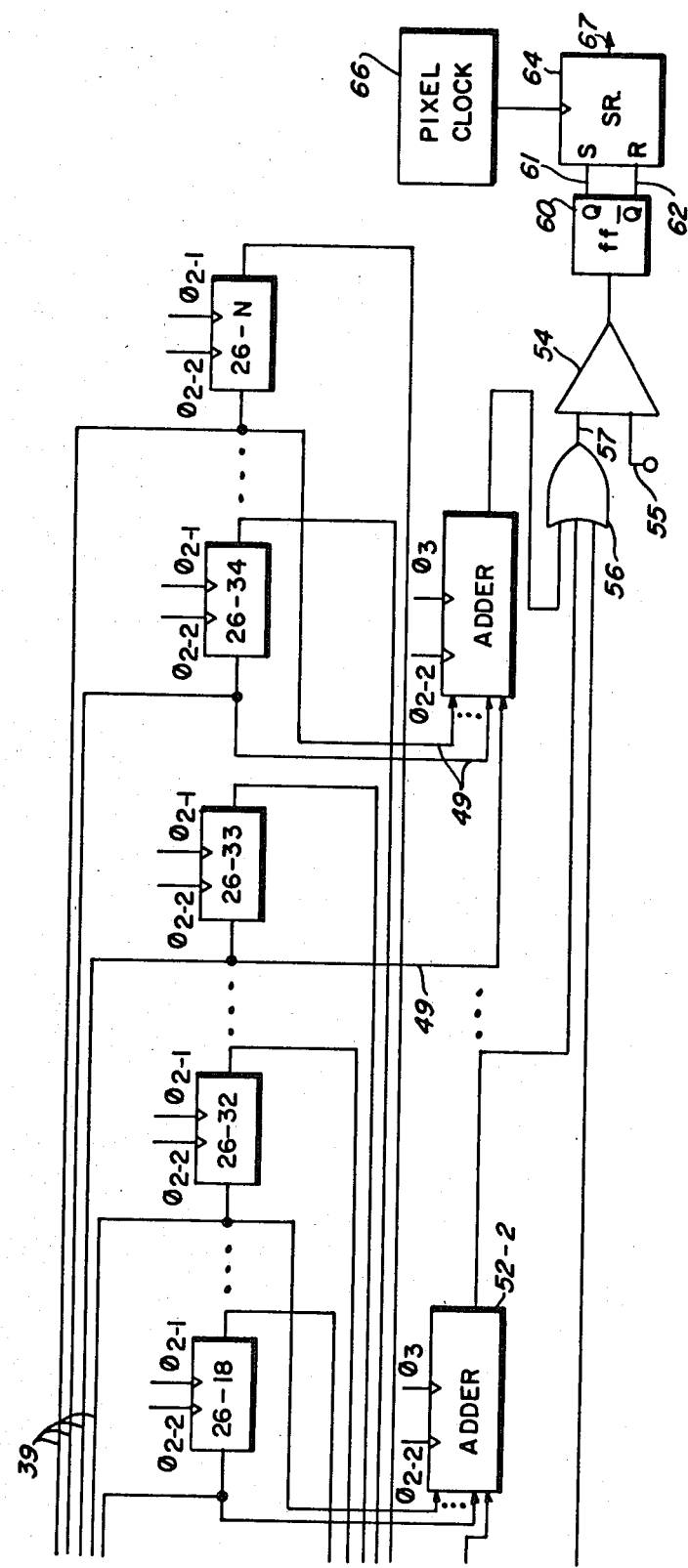
Figure 2:
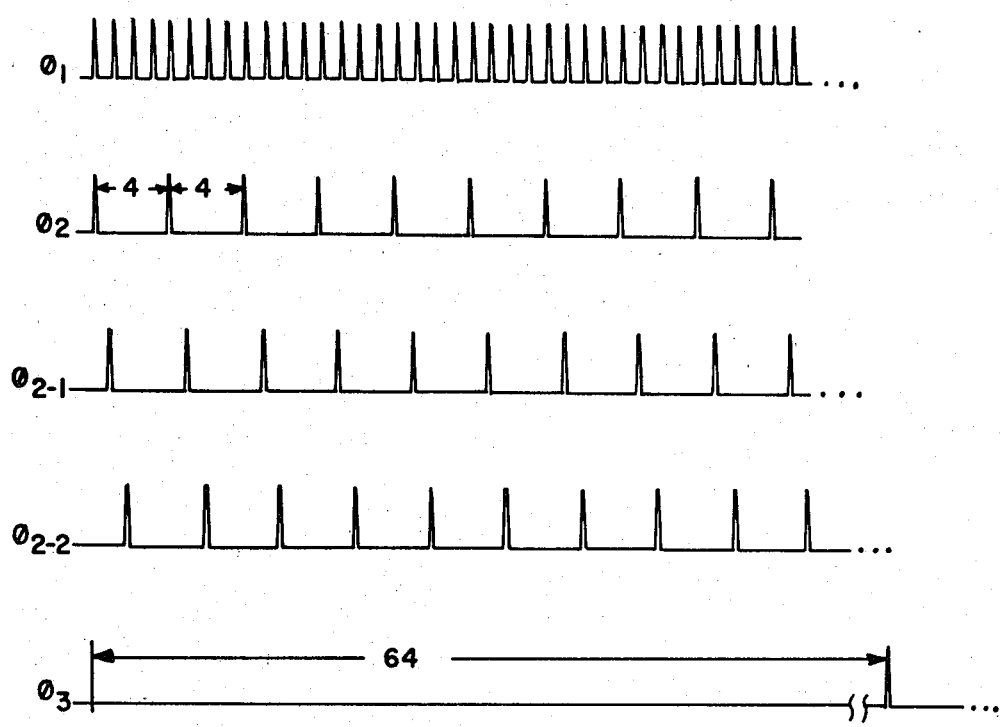

FIGS. 1 and 1b are a schematic view showing the image processing control of the present invention; and FIG. 2 is a timing chart illustrating the operating timing sequences of the processing control shown in FIG. 1.

Referring to the drawings, video image signals or pixels derived from a suitable source such as a memory, a raster input scanner, and the like, are input through line 11 to shift register 14 of the image processing circuit 10. Shift register 14 may comprise any suitable shift register having a capacity sufficient to generate an address composed of N number of pixels. In the exemplary arrangement shown and described herein, shift register 14 provides a 12 pixel wide address which as will appear is incremented or updated every fourth pixel. Other address sizes and increments may be readily envisioned.

A suitable clock 16 provides clock pulses $\phi_1$ to clock line 17 and the clock input terminal of shift register 14, the clock signals $\phi_1$ serving to clock image pixels to shift register 14 from the signal source. In the example shown, the clock pulses $\phi_1$ from clock 16 are input to divide by 4 clock circuit 19. As will appear, clock circuit 19 serves to provide in clock lead 21 clock pulses $\phi_2$ at $\frac{1}{4}$ the rate of clock pulses $\phi_1$ to the clock output terminal of shift register 14 to output a 12 pixel address to Random Access Memory (RAM herein) 24 via bus 25. Since clock signals $\phi_2$ are $\frac{1}{4}$ the frequency of clock signals $\phi_1$, the pixel address output by shift register 14 is accordingly updated at every fourth pixel. Clock circuit 19 additionally provides delayed clock pulses $\phi_{2-1}$ and $\phi_{2-2}$ to clock leads 21' and 21" respectively. Clock circuit 20 as will appear provides clock pulses $\phi_3$ at 1/16 rate of clock pulses $\phi_2$ to clock lead 22. The relative relationship of the aforementioned clock pulses is shown in FIG. 2.

In order to segment the image pixels and identify the halftone and text areas of an image which typically comprises a document page, a table look up procedure is used (MICRO detection). However, because of varying tints, noise and arbitrary threshold levels, many bit patterns may be representative of both halftone and text, and to accommodate this and fine tune the system, a post processing technique is utilized to further delineate the image areas as will appear (MACRO detection). The post processing technique, called Neighborhood Logic, is relied upon to fill in the image areas where halftone is present as well as eliminate any false detections which may have occurred in image areas which are not halftone.

To effectuate post processing, a series of 4-bit counters 26-1, 26-2, . . . 26-n are use to store information about the current scanline as well as previous scanlines. Each counter is associated with a 4-bit wide column on the page being processed which as will be understood corresponds to the cyclic updating of the address output of shift register 14 every fourth pixel. By making additions and subtractions to counters 26-1, 26-2, . . . 26-n depending on the current scanline, the presence of a halftone area and the location thereof may be determined. As a result, each counter contains image data in the vertical scan direction for the image column associated therewith. To obtain information in the horizontal scan direction as well, image data from counters 26 is processed in blocks to decide whether the image data should be classified as halftone or text.

In the present arrangement, original halftone detection is accomplished by the aforementioned table look up procedure using RAM 24. In the exemplary arrangement described, a 12-bit table with $2^{12}$ or 4096 locations is stored in RAM 24. Samples are taken across a 12-bit, 1-dimensional window, the window being shifted in bits of 4 across each incoming scanline with each updating of the address output of shift register 14. If the memory location addressed by the output of shift register 14 is a halftone, then a block of "1"s are injected into the output stream in line 23. If however the RAM memory location addressed is text, then a block of "0"s are injected into the output stream. The window, i.e. address is then shifted 4 bits to the right and the next 12 bit block of image pixels used to address RAM 24.

This process continues until the last 12-bit window in the scanline has been processed. The next scanline is then processed, and so forth and so on until the entire image is processed.

As indicated, the look up table in RAM 24 serves to classify each 12-bit string of pixels as either halftone or text. To permit this, statistics are collected that will differentiate between halftone and textual bit patterns. In one embodiment, three sample images were used to represent halftone information at 100, 133 and 150 cells/inch in tints ranging from 75% to 2%. A histogram was then performed to identify the 12-bit patterns and the bit pattern frequency. Similarly, three sample images were used to represent textual information at 65 and 85 cells/inch in tints ranging from 75% to 2%, and a full page of linecopy in various sizes and fonts. A histogram was then performed to identify the 12 bit patterns and the bit pattern frequency. (Since in the example given 12 bits are being analyzed, it will be understood that each histogram contained bits numbered from 0 to 4095.)

The table look up values for RAM 24 were then generated using the aforedescribed halftone and textual histograms in accordance with the following relationships:

If: Halftone Bin(N)/X > Text Bin(N)

Then: RAM(N) = 1 (denoting a predominately halftone bit pattern)
Else: RAM(N) = 0 (denoting a predominately textual bit pattern)

where: Bin represents each bit classification for the number of bits used in the analysis (i.e. 12 bits has 4096 possible classifications or bins), and X is some number less or equal to 1 used to control how much error will be allowed in misclassifying the bit patterns stored in RAM 24. The larger X is, the fewer the number of text bit patterns that are incorrectly classified as halftone that will be obtained. Increasing X however decreases the detection rate in halftone areas.

It has been found that the foregoing table look up method only provides an average detection rate of approximately 60% in random image halftone areas and a false detection rate of approximately 0.16% in image text areas. Neighborhood Logic is used to bring the detection rate as close to 100% as possible in the image halftone areas and as close to 0.00% as possible in the image text areas.

For Neighborhood Logic, the image signals output by RAM 24 are post processed in blocks for halftone detection and image segmentation. In this process, information about previous pixels above and around the pixel block being processed is used to make a decision on the block being processed. In the example shown, the image signals are processed in blocks composed of a preset number of image signals. In the exemplary arrangement shown, each block is 64 pixels wide.

For post processing purposes, the image signals output by RAM 24, which initially identify the image pixels as either halftone or text, are fed through line 23 to multiplexer 30. Multiplexer 30, which comprises a 2:1 selector, serves to couple either 1 count Subtractor 32 or multiplexer 44 of halftone locating circuit 33 to the input of 1:n multiplexer 38.

The number of counters 26-1, 26-2, ... 26-n provided is sufficient to accommodate the entire scanline. The output terminals of 1:n multiplexer 38 are coupled to the inputs of counters 26-1, 26-2, ... 26-n through lines 39 and by lines 49 to Adders 52 as will appear. As described, counters 26-1, 26-2, ... 26-n each comprise a 4-bit counter having a count which may range from 0-15. As will be understood, each counter 26-1, 26-2, ... 26-n represents 4 pixel locations in the scanline being processed.

It will be understood that the bit size of counters 26-1, 26-2, ... 26-n may vary.

Halftone locating circuit 33 includes a comparator 40 for comparing the existing count on individual counters 26-1, 26-2, ... 26-n which represents the imaging conditions of prior scanlines, with a preset threshold in the form of a predetermined maximum count (i.e. 15) input via line 41. Where the count on an individual counter is below the predetermined maximum count, the signals from comparator 40 sets 2:1 multiplexer 44 via line 42 to couple the output of Adder 34 to the input of 2:1 multiplexer 30. Where the count is equal to or above the predetermined maximum count, the signal from comparator 40 couples the output of maximum counter 46 through multiplexer 44 to the input of multiplexer 30.

As described, the outputs of 1:n multiplexer 38 are coupled by lines 49 to Adders 52, there being one Adder 52 associated with each 16 output terminals of multiplexer 38 to thereby provide the aforementioned block of image signals 64 pixels wide. Adders 52 serve to sum the count in each block of image signals output through multiplexer 38. The output of Adders 52 (total count) representing the sum of the image signal block input thereto, is fed via OR gate 56 and line 57 to a comparator 54 where the total count is compared with a preset threshold input in line 55. As will be understood, the threshold level in line 55 is in the form of a predetermined number (i.e. 57). Where the total count of an Adder 52 is greater than the threshold level, the block of pixels being examined is considered to be halftone. If the count is equal to or less than the threshold level, the block of pixels is considered to be line or text image.

The signal output of comparator 54 is fed to control flip flop 60, the Q and Q output terminals of which are coupled by lines 61, 62 to the set and clear gates of N-bit shift register 64 which serves as a pixel generator. Shift register 64, which is clocked at a preset pixel rate by the clock signals output by pixel clock 66, provides a stream of image pixels representing either halftone or text images to output bus 67.

To apply the counts on counters 26-1, 26-2, ... 26-n to comparator 40 of halftone locating circuit 33, the outputs of counters 26-1, 26-2, ... 26-n are coupled through lines 69, n:1 multiplexer 70, latch 71, and line 73 to comparator 40.

Operational timing for the halftone detection circuit 10 is derived from clock 16, divide by 4 circuit 19, and divide by 16 circuit 20. As described, clock pulses $\phi_1$ are used to clock the input of pixels to shift register 14 and to clock the output of signals from RAM 24. Clock pulses $\phi_2$ from divide by 4 clock circuit 19 are employed to index the 12-bit pixel signal output of shift register 14 to RAM 24, and to index 1:n multiplexer 38 and n:1 multiplexer 70. Clock pulses $\phi_{2-1}$ clock the output of counters 26-1, 26-2, ... 26-n to multiplexer 70 and halftone locating circuit 33 while clock pulses $\phi_{2-2}$ clock Subtractor 32, Adder 34, and maximum counter 46 of halftone locating circuit 33, and the input of image signals to counters 26-1, 26-2, ... 26-n and Adders 52. The clock signals $\phi_3$ output by divide 16 clock circuit 20 are output through clock lead 22 to clock the output of Adders 52 to gate 56 and comparator 54.

OPERATION

At the outset, counters 26 are initialized to 0. Image pixels from a suitable source are input to shift register 14 at the predetermined clock rate $\phi_1$ through line 11. Shift register 14 provides in output bus 25 a 12-bit address corresponding to the image pixels input thereto which is used to address the look up table in RAM 24 at the clock rate $\phi_2$. RAM 24 outputs a predetermined block of binary signals corresponding to the memory locations addressed through line 23 to 2:1 multiplexer 30 at the clock rate $\phi_1$. The signal output of RAM 24 to multiplexer 30 sets multiplexer 30 to couple the output of either Subtractor 32 or of multiplexer 44 of halftone locating circuit 33 to 1:n multiplexer 38. Multiplexer 44 in turn controls the coupling of either Adder 34 or maximum counter 46 to multiplexer 30 in accordance with the existing count on counters 26.

At the same time, multiplexer 38 is operated in synchronism with the addressing of RAM 24 to successively couple individual counters 26-1, 26-2, . . . 26-n and Adders 52 to the output of 2:1 multiplexer 30. As a result, on clock pulse $\phi_{2\text{-}2}$ the count on counters 26-1, 26-2, . . . 26-n is changed to reflect the additive and subtractive output of halftone locating circuit 33. The additive or subtractive outputs of circuit 33 are summed in blocks of 64 by successive Adders 52 and on clock pulse $\phi_3$, the total unloaded through line 55 and OR gate 56 to comparator 57. Comparator 57 compares the signal output of Adders 52 to a preset threshold in the form of a predetermined count in line 55, and outputs either a binary 1 or 0 signal to control flip flop 60 in response thereto. The output of flip flop 60 in turn controls the pixel output of shift register 64 to output bus 67.

In the aforedescribed process, at each clock pulse $\phi_{2\text{-}1}$, latch 71 is reset to the existing count on the appropriate counter 26-1, 26-2, . . . 26-n. The output of latch 71, representing the count on the counter then coupled to latch 71 by multiplexer 70, is compared with the predetermined maximum count input through line 41. Where the comparison indicates that the then count on the counter being examined is equal to the maximum count, multiplexer 44 is actuated to couple maximum counter 46 to multiplexer 30. Where the count is below the maximum count, multiplexer 44 is set to couple Adder 34 to multiplexer 30. Thereafter, on clock pulse $\phi_{2\text{-}2}$, halftone locating circuit 33 is actuated to output a signal, either from Subtractor 32, or Adder 34 or maximum counter 46 through multiplexers 30, 38 to the counter 26-1, 26-2, . . . 26-n and the Adder 52 currently actuated as described heretofore.

It will be understood that the various values presented herein are examples only and it is not intended that the invention be limited to the specific values provided herein.

While the invention has been described with reference to the structure disclosed, it is not confined to the details set forth, but is intended to cover such modifications or changes as may come within the scope of the following claims.

We claim:

1. A method of processing image pixels line by line to enhance distinctions between halftone and text images, comprising the steps of:
   (a) performing an initial distinction between halftone and text images by addressing a memory having predetermined halftone and text relationships stored therein with successive groups of said image pixels to provide halftone and text signals;
   (b) generating a count signal in accordance with said halftone and text signals for each group of image pixels;
   (c) providing a preset count in response to said count signal for each group of image pixels;
   (d) summing a predetermined number of said preset counts to provide a total count;
   (e) comparing said total count with a predetermined fixed threshold to provide an enhanced control signal identifying the presence of either halftone or text images; and
   (f) operating an image generator to output halftone or text image signals in response to said enhanced control signal.

2. The method according to claim 1 including the steps of:
   applying said preset count to a scanline counter associated with each group of image pixels to update the count on said counter, and
   using the updated count on said counter to generate said preset count for the same group of image pixels in the next line of image pixels.

3. The method according to claim 2 including the steps of selectively increasing or decreasing the count on said scanline counter by a predetermined amount in accordance with said halftone and text signals.

4. The method according to claim 2 including the step of increasing the count on said scanline counter by a predetermined amount in response to said halftone signals.

5. The method according to claim 4 including the step of resetting said scanline counter to zero on attainment of a preset maximum count.

6. The method according to claim 2 including the step of decreasing the count on said scanline counter by a predetermined amount in response to said text signals.

7. Apparatus for processing image pixels to enhance the distinctions between halftone and text images comprising in combination:
   memory means for storing discrete halftone and text image signals at predetermined addresses;
   addressing means for addressing said memory means using a preset combination of successive image pixels to provide halftone and text identifying signals;
   a plurality of scanline counters;
   a counter actuating means for changing the current count on said counters in response to said halftone and text signals output by said memory means;
   a plurality of adders, there being one adder associated with each of a preset number of said counters;
   means for successively processing the count on each of said counters to provide a predetermined count;
   means for loading the adder associated with said counter with said predetermined counts;
   means for deriving a halftone or text signal from the output of said adders; and
   means for generating halftone or text pixels in response to said halftone and text signals.

8. The apparatus according to claim 7 including means for retaining the count on said counters for use in processing subsequent image lines.

9. The apparatus according to claim 8 in which said counter actuating means includes means for limiting the count on said counters to a preset maximum count.

10. The apparatus according to claim 8 in which said counter actuating means includes means for increasing the count on said counters by a predetermined amount in response to said halftone text signal.

11. The apparatus according to claim 8 in which said counter actuating means includes means for reducing the count on said counters by a predetermined amount in response to said text signal.

* * * * *